United States Patent [19]

Kawaguchi et al.

[11] Patent Number: 5,162,121

[45] Date of Patent: *Nov. 10, 1992

[54] APPARATUS FOR EXTRUDING MULTIPLE SYNTHETIC RESINS

[75] Inventors: Kiyoshi Kawaguchi; Hideki Yagishi, both of Yokohama, Japan

[73] Assignee: Toyo Seikan Kaisha, Ltd., Tokyo, Japan

[*] Notice: The portion of the term of this patent subsequent to Apr. 14, 2009 has been disclaimed.

[21] Appl. No.: 671,481

[22] Filed: Mar. 14, 1991

Related U.S. Application Data

[63] Continuation of Ser. No. 301,385, Jan. 25, 1989, Pat. No. 5,104,305.

[30] Foreign Application Priority Data

Jan. 30, 1988 [JP] Japan .................. 63-18543

[51] Int. Cl.$^5$ ............................................. B29C 45/16
[52] U.S. Cl. ................................................. 425/130
[58] Field of Search ................ 425/130, 572, 131.1, 425/133.1, 381, 562, 564, 463, 462, 132; 264/328.9, 328.12, 328.15

[56] References Cited

U.S. PATENT DOCUMENTS

| | | | |
|---|---|---|---|
| 4,497,621 | 2/1985 | Kudert et al. | 425/572 |
| 4,808,101 | 2/1989 | Schad et al. | 425/130 |
| 5,028,226 | 7/1991 | De'ath | 425/130 |

Primary Examiner—Tim Heibrink
Attorney, Agent, or Firm—Beveridge, DeGrandi & Weilacher

[57] ABSTRACT

A nozzle device for extruding multiple synthetic resins as a resin composite, having a main extrusion flow passage having a main extrusion opening, a subsidiary extrusion flow passage having a subsidiary extrusion opening, at least a downstream portion of the subsidiary extrusion flow passage being disposed in the main extrusion flow passage, and an opening-closing member for opening or closing the subsidiary extrusion opening. The nozzle device further has an auxiliary extrusion flow passage which has an auxiliary extrusion opening and at least a downstream portion of which extends through the main extrusion flow passage as it surrounds the downstream portion of the subsidiary extrusion flow passage. The auxiliary extrusion opening is positioned downstream of the subsidiary extrusion opening and the downstream end portion of the auxiliary extrusion flow passage has a tapered part. The auxiliary extrusion flow passage is designed such that when the opening-closing member is held at a position at which it closes the subsidiary extrusion opening, a synthetic resin flowing through the auxiliary extrusion flow passage and extruded into the main extrusion flow passage through the auxiliary extrusion opening flows while undergoing collision with the forward end portion of the opening-closing member.

4 Claims, 5 Drawing Sheets

APPARATUS FOR EXTRUDING MULTIPLE SYNTHETIC RESINS

REFERENCE TO RELATED APPLICATION

This is a continuation of U.S. patent application Ser. No. 07/301,385 filed Jan. 25, 1989, now U.S. Pat. No. 5,104,305 entitled Nozzle Device for Extrusion of Multiple Synthetic Resins.

FIELD OF THE INVENTION

This invention relates to a nozzle device for use in extruding multiple synthetic resins as a resin composite.

DESCRIPTION OF THE PRIOR ART

Japanese Laid-Open Patent Publication No. 184817/1987 discloses a multilayered compression-molded article comprising a first synthetic resin layer and a second synthetic resin layer substantially entirely surrounded by the first synthetic resin layer. This multilayered compression-molded article is embodied conveniently as a container, a container closure or a container closure liner. Generally, the first resin layer is formed of a synthetic resin having excellent mechanical properties and hygienic characteristics, and the second resin layer, from a synthetic resin having excellent gas-barrier property or thermal resistance.

This patent document discloses an extrusion apparatus for extruding multiple synthetic resins as a resin composite containing the first resin and the second resin substantially entirely surrounded by the first resin as materials to be compression-molded into the multilayered article. The extrusion apparatus is provided with a nozzle device including a main extrusion flow passage and a subsidiary extrusion flow passage. At least a downstream portion of the subsidiary extrusion flow passage is disposed within the main extrusion flow passage, and an opening-closing member is provided for opening or closing a subsidiary extrusion opening formed in the downstream end of the subsidiary extrusion flow passage. When the subsidiary extrusion opening intermittently is opened by operating the opening-closing member, the second resin flowing through the subsidiary extrusion flow passage is extruded intermittently into the first resin flowing through the main extrusion flow passage. As a result, a composite comprising the first resin and the second resin surrounded substantially entirely by the first resin is extruded from a main extrusion opening formed in the downstream end of the main extrusion flow passage.

Experiments conducted by the present inventors show that in the nozzle device disclosed in the above-cited patent document, the second resin remains existing in a thread-like form in the first resin even after the subsidiary extrusion opening is closed by the opening-closing member ("roping phenomenon"). In the event that the roping phenomenon occurs, the second resin is not covered with the first resin but exposed to view locally at the time of occurrence of roping, and this will result in delamination between the first resin layer and the second resin layer.

SUMMARY OF THE INVENTION

It is a primary object of this invention to inhibit greatly, or avoid, the occurrence of the roping phenomenon by improving the above nozzle device used for extruding multiple resins as a resin composite.

Another object of this invention is to inhibit greatly, or avoid, the occurrence of the roping phenomenon without unduly complicating the structure and operation of the nozzle device.

Experiments conducted by the present inventors led to the discovery that the occurrence of the roping phenomenon is due mainly to the second resin adhering to the forward end portion of the opening-closing member which has closed the subsidiary opening. Continued studies including additional experiments have now led to the discovery that the occurrence of the roping phenomenon can be inhibited greatly or circumvented by (a) providing an auxiliary extrusion flow passage at least a downstream portion of which extends through the main extrusion flow passage surrounding the downstream portion of the subsidiary extrusion flow passage, and which has an auxiliary extrusion opening at its downstream end downstream of the subsidiary extrusion opening, and (b) forming a tapered part in the downstream end portion of the auxiliary extrusion flow passage so that when the opening-closing member is held at a closing position at which it closes the subsidiary extrusion opening, the resin which flows through the auxiliary extrusion flow passage and is extruded into the main extrusion flow passage from the auxiliary extrusion opening flows while colliding with the forward end portion of the opening-closing member thereby scraping off the resin remaining there. The resin caused to flow through the auxiliary extrusion flow passage may be the same as the first resin flowing through the main extrusion flow passage, or a resin which has excellent adhesion and can be consolidated with it firmly.

Accordingly, the present invention provides a nozzle device for extrusion of multiple synthetic resins as a resin composite, comprising a main extrusion flow passage having a main extrusion opening, a subsidiary extrusion flow passage having a subsidiary extrusion opening, at least a downstream portion of the subsidiary extrusion flow passage being disposed in the main extrusion flow passage, and an opening-closing member for opening or closing the subsidiary extrusion opening; the nozzle device further comprising an auxiliary extrusion flow passage which has an auxiliary extrusion opening and at least a downstream portion of which extends through the main extrusion flow passage as it surrounds the downstream portion of the subsidiary extrusion flow passage, said auxiliary extrusion opening being positioned downstream of the subsidiary extrusion opening and the downstream end portion of the auxiliary extrusion flow passage having a tapered part, and said auxiliary extrusion flow passage being designed such that when the opening-closing member is held at a position at which it closes the subsidiary extrusion opening, a synthetic resin flowing through the auxiliary extrusion flow passage and extruded into the main extrusion flow passage through the auxiliary extrusion opening flows while colliding with the forward end portion of the opening-closing member.

In the nozzle device of this invention, the synthetic resin which flows through the auxiliary extrusion flow passage and is extruded into the main extrusion flow passage from the auxiliary extrusion opening collides with the forward end portion of the opening-closing member at the closing position and effectively scrapes off the synthetic resin remaining there. Accordingly, it can be clearly understood in conjunction with Examples and Comparative Examples given hereinafter that the occurrence of the roping phenomenon can be inhibited greatly or circumvented.

BRIEF DESCRIPTION OF THE ACCOMPANYING DRAWINGS

DETAILED DESCRIPTION OF THE PREFERRED EMBODIMENTS

The preferred embodiments of the nozzle device of the invention will now be described in detail with reference to the accompanying drawings.

Figure 1:
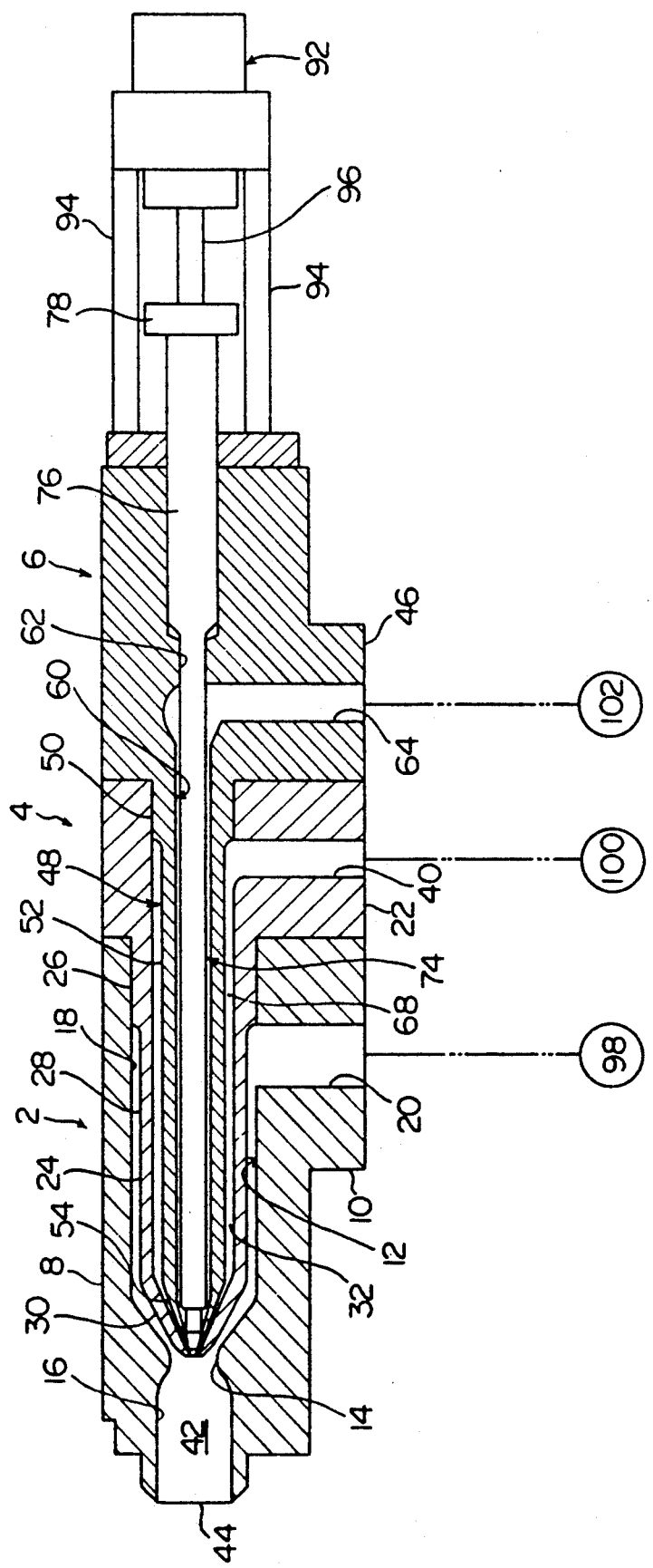
FIG. 1 is a sectional view showing a preferred embodiment of the nozzle device constructed in accordance with this invention.
Figure 2:
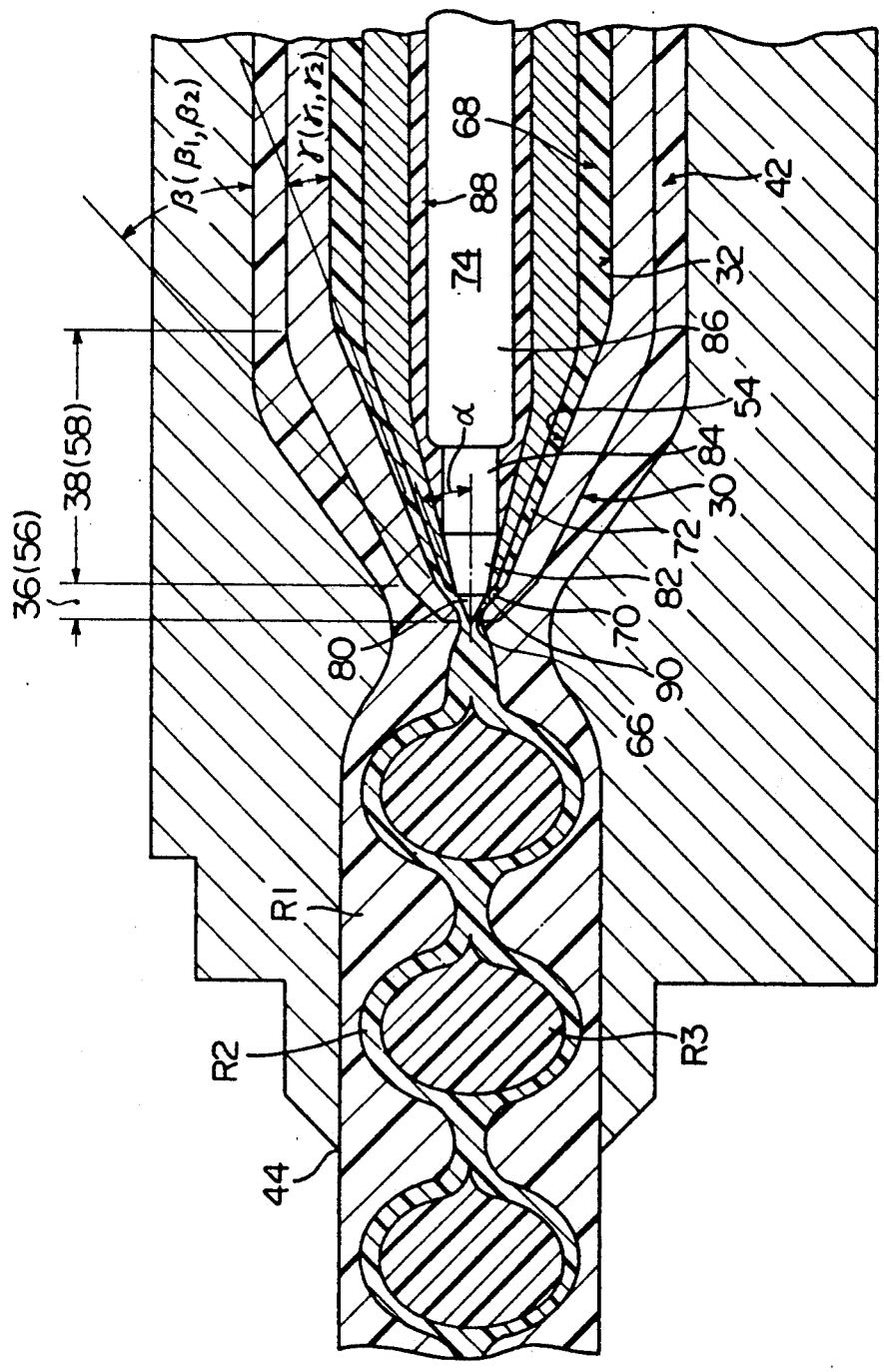
FIGS. 2 and 3 are partial sectional views showing part of the nozzle device of FIG. 1 in a state in which the subsidiary extrusion opening is closed and opened, respectively.
Figure 3:
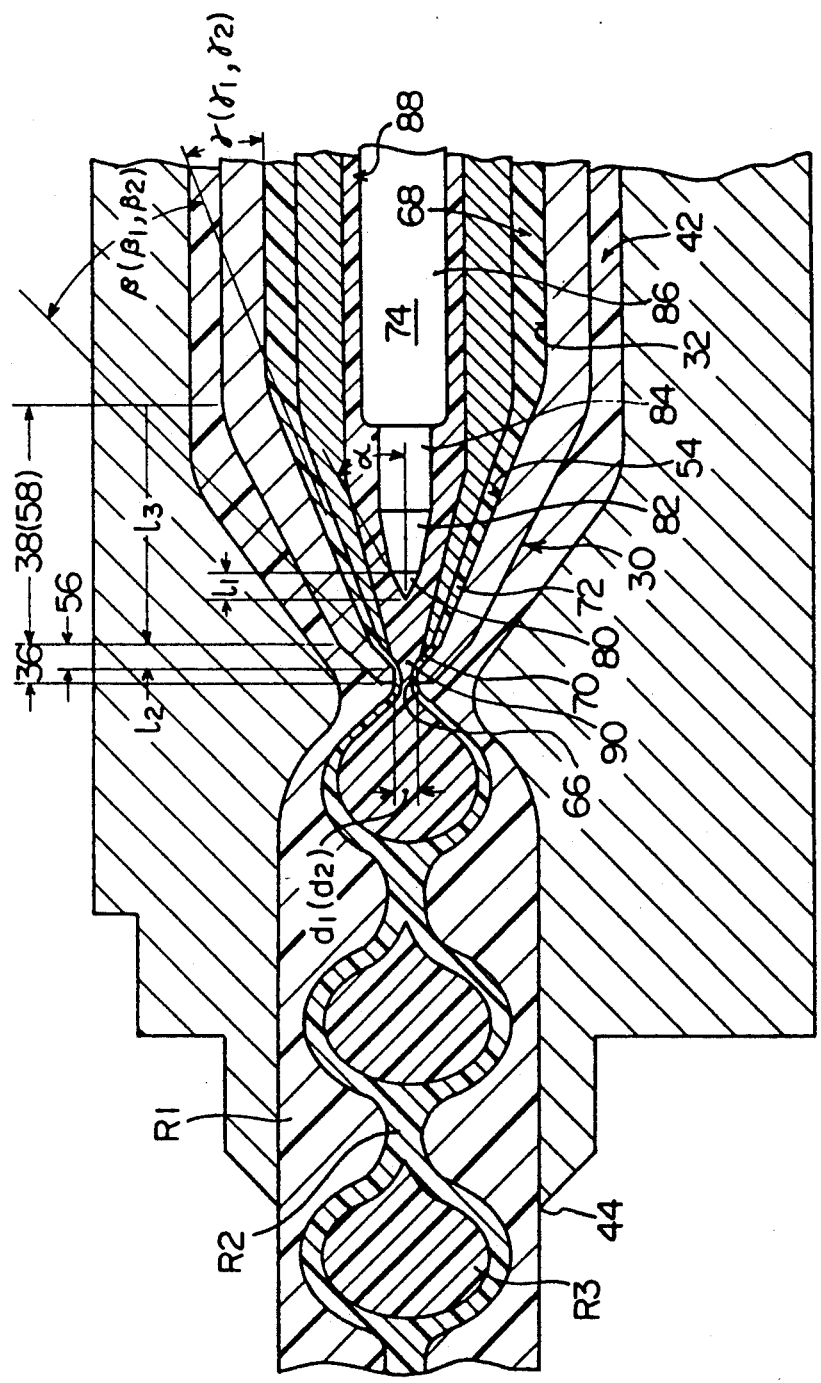

With reference to FIG. 1, the nozzle device includes a main member 2, an auxiliary member 4 and a subsidiary member 6 assembled sequentially as shown. The main member 2 has a main portion 8 which may be nearly cylindrical and a projecting portion 10 extending downwardly from the rear end portion (the right end portion in FIG. 1) of the main portion 8. A through-hole 12 extending in the right-left direction through the main portion 8 is formed in the main member 2. Conveniently, the through-hole 12 has a circular cross-sectional shape. A throat portion 14 with its inside diameter progressively decreasing and then progressively increasing is formed in the front part of the through-hole 12. The inside diameter of a front portion 16 positioned forwardly of the throat portion 14 is smaller by a predetermined amount than the inside diameter of a rear portion 18 positioned rearwardly of the throat portion 14. The main member 2 further has formed therein an introduction hole 20 extending downwardly from the rear portion 18 of the through-hole 12 to the projecting end of the projecting portion 10. The auxiliary member 4 has a base portion 22 having an outer shape corresponding to the outer configuration of the rear end of the main member 2 and a nearly cylindrical extension 24 extending forwardly from the base portion 22. The extention 24 consists of a rear portion 26 having substantially the same outside diameter as the inside diameter of the rear portion 18 of the through-hole 12 in the main member 2, an intermediate portion 28 having an outside diameter smaller by a predetermined amount than the outside diameter of the rear portion 26, and a nearly frustoconical front portion 30 of which outside diameter progressively decreases toward its forward end. A through-hole 32 extending in the right-left direction in FIG. 1 is formed in the auxiliary member 4. The through-hole 32 has a circular cross-sectional shape, and its front portion is of nearly fructoconical shape whose outside diameter progressively decreases toward its forward end. With reference to FIGS. 2 and 3, the front portion of the through-hole 32 comprises a circular opening (auxiliary extrusion opening 66) located at its front end, a first frustoconical portion 36 following the circular opening, and a second frustoconical portion 38 following the first frustoconical portion 36. The tapering inclination angle $\beta_1$ of the first frustoconical portion 36 is set at a valve slightly larger than the tapering inclination angle $\gamma_1$ of the second frustoconical portion 38. Preferably, the tapering inclination angle $\beta_1$ is about 85 to 25 degrees, ad the tapering inclination angle $\gamma_1$ is about 60 to 20 degrees. Again with reference to FIG. 1, the auxiliary member 4 further has formed therein an introduction hole 40 extending downwardly from the rear portion of the through-hole 32 to the lower end of the base portion 22.

As is shown in FIG. 1, the auxiliary member 4 is combined with the main member 2 by inserting the extension 24 of the auxiliary member 4 concentrically into the through-hole 12 of the main member 2 from the back of the hole 12. As a result, the extension 24 of the auxiliary member 4 extends as far as the throat portion 14 of the through-hole 12, and the rear end of the through-hole 12 of the main member 2 is closed by the rear portion 18 of the extension 24 of the auxiliary member 4 to thereby define a main extrusion flow passage 42 composed of the introduction hole 20 in the main member 2, an annular peripheral edge region of the through-hole 12 of the main member 2 which exists up to the throat portion 12 and remains around the extension 24 of the auxiliary member 4, and that part of the through-hole 12 of the main member 2 which ranges from the throat portion 14 to the front portion 16. The front end of the through-hole 12 of the main member 2 constitutes a main extrusion opening 44 positioned at the downstream end of the main extrusion flow passage 42.

Further with reference to FIG. 1, the subsidiary member 6 has a base portion 46 corresponding to the base portion 22 of the auxiliary member 4 and a nearly cylindrical extension 48 extending forwardly from the base portion 46. The extension 48 is comprised of a rear portion 50 having substantially the same outside diameter as the inside diameter of the rear portion of the through-hole 32 in the auxiliary member 4, an intermediate portion 52 having an outside diameter smaller by a predetermined amount than the outside diameter of the rear portion 50, and a nearly frustoconical front portion 54 whose outside diameter progressively decreases toward its forward end. With reference to FIGS. 2 and 3, the front portion 54 includes a first frustoconical portion 56 positioned at its front end and a second frustoconical portion 58 following the first one 56. The tapering inclination angle $\beta_2$ of the first frustoconical portion 56 is substantially equal to the tapering inclination angle $\beta_1$ of the first frustoconical portion 36 described hereinabove, and the tapering inclination angle $\gamma_2$ of the second frustoconical portion 58 is substantially equal to the tapering inclination angle $\gamma_1$ of the second frustoconical portion 38 described hereinabove. With reference to FIG. 1, a through-hole 60 extending in the right-left direction in FIG. 1 is formed in the subsidiary member 6. The through-hole 60 has a circular cross-sectional shape and its front portion is frustoconical with its outside diameter progressively decreasing toward its front end. A small-diameter portion 62 is formed in the rear portion of the through-hole 60. The subsidiary member 6 further has formed therein an introduction hole 64 which just ahead of the small-diameter portion 62, extends downwardly from the through-hole 60 to the lower end of the base portion 46.

As shown in FIG. 1 the subsidiary member 6 is combined with the auxiliary member 4 by inserting the extension 48 of the subsidiary member 6 concentrically into the through-hole 32 of the auxiliary member 4 from its back. As a result, the extension 48 of the subsidiary member 6 extends to a site slightly rearwardly of the front end of the through-hole 32, and the rear end of the through-hole 32 is closed by the rear portion 50 of the extension 48. Thus, an auxiliary extrusion flow passage 68 is defined by the introduction hole 40 in the auxiliary member 4, an annular peripheral edge region remaining around the extension 48 of the subsidiary member 6 in the through-hole 32, and an auxiliary extrusion opening 66 (FIG. 3) at the front end of the through-hole 32. The main portion of the auxiliary extrusion flow passage 68 excluding an introduction portion defined by the introduction hole 40 extends concentrically within the main extrusion flow passage 42. As clearly depicted in FIGS. 2 and 3, the downstream end portion of the auxiliary extrusion flow passage 68 comprises a first tapered portion 70 frustoconical in shape and a second tapered portion 72 following the first one 70 and located upstream thereof. The tapering inclination angle $\beta$ of the first tapered portion 70 is substantially equal to the aforesaid tapering inclination angles $\beta_1$ and $\beta_2$, and the tapering inclination angle $\gamma$ of the second tapered portion 72 is substantially equal to the above-mentioned tapering inclination angles $\gamma_1$ and $\gamma_2$. If desired, it is possible to make the tapering inclination angle $\beta$ substantially equal to the tapering inclination angle $\gamma$, or in other words, to form the first tapered portion 70 and the second tapered portion 72 in a smoothly continuous single frustoconical shape. In any case, it is preferred that the tapering inclination angle $\beta$ be about 85 to 25 degrees, and the tapering inclination angle $\gamma$ be about 60 to 20 degrees. Preferably, the cross-sectional area of the auxiliary extrusion opening 66 is substantially equal to that of the subsidiary extrusion opening.

Again with reference to FIG. 1, the nozzle device further includes a opening-closing member 74 for opening or closing the subsidiary extrusion opening. The illustrated opening-closing member is generally in the shape of an elongate round rod, and has a relatively large-diameter portion 76 in its rear part and a flange 78 at its rear end. As clearly shown in FIGS. 2 and 3, the forward end portion 80 of the opening-closing member 74 is of a tapered, or more specifically, conical shape. The tapering inclination angle $\alpha$ of the forward end portion 80 is smaller than the tapering inclination angle $\beta$ mentioned above, and preferably about 60 to 15 degrees. The opening-closing member 74, following the conical forward end portion 80, a frustoconical portion 82, a small-diameter cylindrical portion 84 and a cylindrical portion 86 positioned in this sequence.

The opening-closing member 74, as shown in FIG. 1, is inserted concentrically into the through-hole 60 of the subsidiary member 6 from the back of the hole 60. As a result, the small-diameter portion 62 of the through-hole 60 of the subsidiary member 6 is closed to define a subsidiary extrusion flow passage 88 comprised of the introduction hole 64 of the subsidiary member 6 and an annular region remaining around the opening-closing member 74 in the through-hole 60 of the subsidiary member 6. The main portion of the subsidiary extrusion flow passage 88 including an introducing portion defined by the introduction hole 64 extends concentrically within the auxiliary extrusion flow passage 68. The front end of the through-hole 60 constitutes a subsidiary extrusion opening 90. The opening-closing member 74 is free to move in the axial direction (the left-right direction in FIG. 1), and is held at a closing position shown in FIGS. 1 and 2 and an opening position shown in FIG. 3 by a moving means 92. The moving means 92 is constructed of a pneumatic pressure cylinder mechanism linked to the rear end of the subsidiary member 6 via a plurality of linking members 94. The forward end of its output rod 96 is connected to the flange 78 formed at the rear end of the opening-closing member 74. When the opening-closing member 74 is held at the closing position by the moving means 92, the subsidiary extrusion opening 90 is closed by the frustoconical portion 82 of the opening-closing member 74, as clearly shown in FIG. 2. The conical forward end portion 80 of the opening-closing member 74 projects downstream beyond the subsidiary extrusion opening 90. When the opening-closing member 74 is moved backwards and held at the opening position shown in FIG. 3 by the action of the moving means 82, not only the frustoconical portion 82 but also the conical forward end portion 80 of the opening-closing member moves backwards from the subsidiary extrusion opening 90 and recedes upstream thereof to open the subsidiary extrusion opening 90.

One example of the operation of extruding multiple synthetic resins (a resin composite) with the nozzle device described above will be described below. As concisely illustrated in FIG. 1, the introduction end of the main extrusion flow passage 42 is connected to a main extruder 98; the introduction end of the auxiliary extrusion flow passage 68, to an auxiliary extruder 100; and the introduction end of the subsidiary extrusion flow passage 88, to a subsidiary extruder 102. If desired, an accummulator may be interposed between the introduction end of the subsidiary extrusion flow passage 88 and the subsidiary extruder 102. The main extruder 98 heat-melts a main resin $R_1$ having excellent mechanical properties and hygienic property and feeds it into the main extrusion flow passage 42. The auxiliary extruder 100 heat-melts an auxiliary resin $R_2$ which is the same as the resin $R_1$ or another well-adherent resin capable of being consolidated fully firmly together with the main resin $R_1$, and feeds it into the auxiliary extrusion flow passage 68. If desired, the auxiliary extruder 100 may be omitted, and the main resin $R_1$ may be fed into both the main extrusion flow passage 42 and the auxiliary extrusion flow passage 68 from the main extruder 98. The subsidiary extruder 102 heat-melts a subsidiary resin $R_3$ having excellent gas-barrier property, and feeds it into the subsidiary extrusion flow passage 88.

The main resin $R_1$ flows continuously toward the main extrusion opening 44 through the main extrusion flow passage 42. The auxiliary resin $R_2$ flows continuously through the auxiliary extrusion flow passage, and flows continuously into the main resin $R_1$ within the main extrusion flow passage 42 from the auxiliary extrusion opening 66. On the other hand, the subsidiary extrusion opening 90 is intermittently opened by the opening-closing member 74. Accordingly, the subsidiary resin $R_3$ flowing through the subsidiary extrusion flow passage 88 flows intermittently into the auxiliary resin $R_2$ flowing through the subsidiary extrusion opening 90. As a result, a resin composite in which the subsidiary resin $R_3$ existing intermittently in a predetermined amount is surrounded by the auxiliary resin $R_2$ and the main resin R continuously existing is continuously extruded from the main extrusion opening 44. The resin composite is cut between two adjoining subsidiary resins $R_3$ by, for example, a cutting blade (not shown) moving across the main extrusion opening 44. The cut material is fed into a compression-molding machine (not shown) for compression-molding it into an article such as a container, a container closure or a closure liner.

It will be readily understood by reference to FIG. 2 that when the opening-closing member 74 is held at the closing position and the subsidiary extrusion opening 90 is closed in the nozzle device of the invention described above, the auxiliary resin flowing into the auxiliary extrusion opening 66 past the first tapered portion 70 of the auxiliary extrusion flow passage 68 collides with the forward end portion 80 of the opening-closing member 74 projecting beyond the subsidiary extrusion opening 90 and scrapes off the subsidiary resin $R_3$ adhering to it. Consequently, the roping phenomenon of the subsidiary resin $R_3$ after the closing of the subsidiary extrusion opening 90 is inhibited markedly or circumvented, and the occurrence of the undesirable roping phenomenon of the subsidiary resin $R_3$ until the next opening of the subsidiary extrusion opening 90 is prevented. When the forward end portion 80 of the opening-closing member 74 is of a tapered shape having a relatively small tapering inclination angle $\alpha$, especially of a conical shape, scraping of the subsidiary resin $R_3$ from the forward end portion 80 is promoted. The tapering inclination angle $\beta$ of the first tapered portion 70 of the auxiliary extrusion flow passage 68 is larger than the tapering inclination angle $\alpha$ of the forward end portion 80 of the opening-closing member 74, and the cross-sectional area of the auxiliary extrusion opening 66 is substantially equal to that of the subsidiary extrusion opening 90. Thus, the auxiliary resin $R_2$ flowing through the first tapered portion 70 collides effectively with the forward end portion 80 of the opening-closing member 74, and the remaining subsidiary resin $R_3$ is scraped effectively from the forward end portion 80. Even if the tapering inclination angle $\beta$ of the first tapered portion 70 of the auxiliary extrusion flow passage 68 is made relatively large, the flowing of the auxiliary resin $R_2$ in the auxiliary extrusion flow passage 68 is unlikely to be impaired because the auxiliary resin $R_2$ flows into the first tapered portion 70 via the second tapered portion 72 whose tapering inclination angle $\beta$ may be smaller than the tapering inclination angle $\alpha$ of the forward end portion 80 of the opening-closing member 74.

In the illustrated embodiment, one subsidiary extrusion flow passage and one auxiliary extrusion flow passage for one main extrusion flow passage. If desired, a plurality of subsidiary extrusion flow passages and a plurality of auxiliary extrusion flow passage may be disposed in a specifically related manner for one main extrusion flow passage.

In the illustrated embodiment, the main extrusion opening 44 of the main extrusion flow passage 42 has a circular sectional shape, and the resin composite extruded from the main extrusion opening 44 has a circular sectional shape. The present invention can also be applied to a nozzle device for extruding a resin composite having an annular sectional shape from a main extrusion opening having an annular shape. In this alternative, the nozzle device may be designed such that a subsidiary extrusion flow passage having an annular sectional shape is disposed in a main extrusion flow passage having an annular sectional shape, an auxiliary extrusion flow passage having an annular sectional shape and surrounding the subsidiary flow passage from inside and outside is disposed in the main extrusion flow passage, and that as in the above-described embodiment, the auxiliary resin flowing into the auxiliary extrusion opening of the auxiliary extrusion flow passage flows while colliding with the forward end portion of the opening-closing member closing the subsidiary extrusion opening.

The following examples illustrate the invention more specifically.

EXAMPLE 1

A nozzle device having the shape illustrated in FIGS. 1 to 3 and the following specification was used.
Tapering inclination angle $\alpha$: 27 degrees
Tapering inclination angle $\beta$: 45 degrees
Tapering inclination angle $\gamma$: 30 degrees
Diameter $d_1$ of the subsidiary extrusion opening: 2.0 mm
Axial length $l_1$ of the forward end portion of the opening-closing member: 2.2 mm
Diameter $d_2$ of the auxiliary extrusion opening: 2.0 mm
Axial length $l_2$ of the first tapered portion: 2.0 mm
Axial length $l_3$ of the second tapered portion: 20 mm A resin sold under the tradename "Polypro J640" by Mitsui Petrochemical Industries, Ltd. was continuously fed into the main extrusion flow passage at an extrusion temperature of 200° to 220° C. and an extrusion rate of 10 kg/hour. A resin sold under the tradename "MODIC P300M" by Mitsubishi Petrochemical Industries, Ltd. was continuously fed into the auxiliary extrusion flow passage at an extrusion temperature of 200° to 220° C. and an extrusion rate of 1 to 2 kg/hour. The subsidiary extrusion opening was opening for about 2 seconds and closed for about 4 seconds, and this cycle was repeated. Only while the subsidiary extrusion opening was closed, a resin sold under the tradename "Eval EP-G" by Kuraray Inc. was fed into the subsidiary extrusion flow passage at an extrusion temperature of 200° to 220° C. under a feed pressure of 120 to 250 kg/cm². The resin composite extruded from the main extrusion opening was cooled and then cut and examined. The resin composite had the vertical sectional shape shown in FIGS. 2 and 3. Roping of the subsidiary resin was only about 5 mm in length.

EXAMPLE 2

Example 1 was repeated except that "Polypro J600" sold by Mitsui Petrochemical Co., Ltd. was fed into the auxiliary extrusion flow passage; and a blend of 90% by weight of "Eval EP-G" sold by Kurarey Inc. and 10% by weight of "MODIC P310S" sold by Mitsubishi Petrochemical Industries, Ltd. was fed into the subsidiary extrusion flow passage. The extruded resin composite was cooled, cut and examined. As in Example 1, the vertical sectional shape of the composite was as shown in FIGS. 2 and 3. Roping of the subsidiary resin was only about 5 mm in length.

COMPARATIVE EXAMPLE 1

Figure 4:
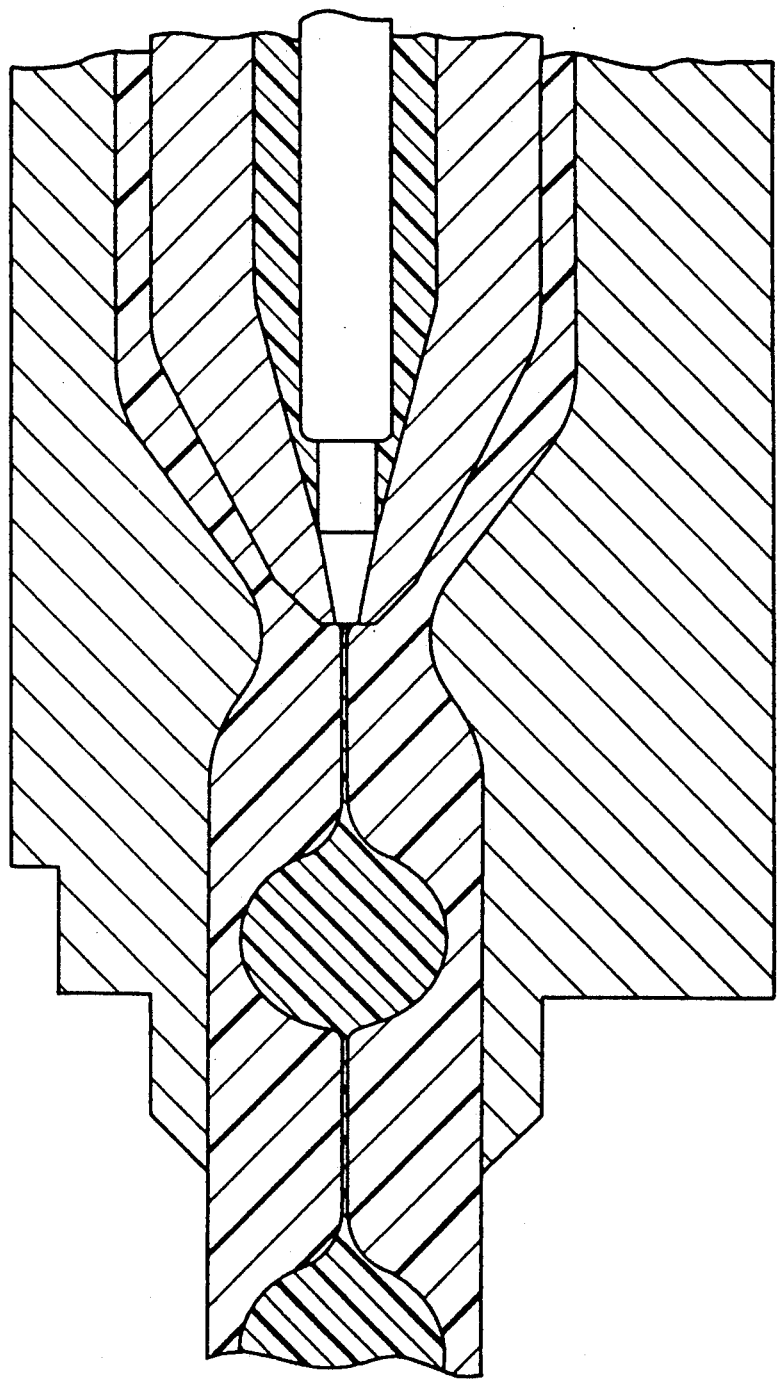
FIGS. 4 and 5 are partical sectional views showing part of the nozzle device used in Comparative Examples in a state in which the subsidiary extrusion opening is closed and opened, respectively.
Figure 5:
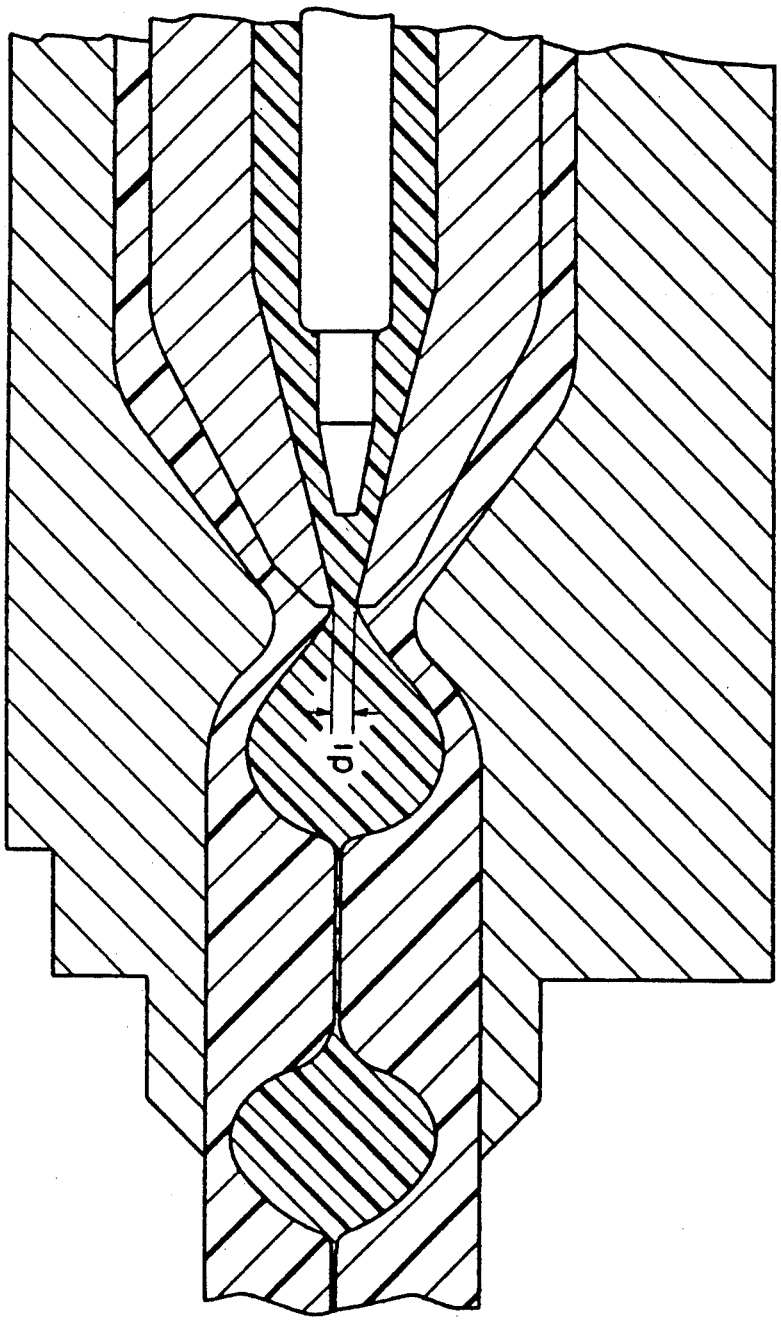

A nozzle device having the shape shown in FIGS. 4 and 5 (therefore, having no auxiliary extrusion flow passage), which had no conical forward end portion in the opening-closing member and in which the diameter of the subsidiary extrusion opening ($d_1$) was 2.0 mm, was used. "Polypro J640" sold by Mitsui Petrochemical Industries, Ltd. was fed continuously into the main extrusion flow passage at an extrusion temperature of 200° to 220° C. and an extrusion rate of 10 kg/hour. The subsidiary extrusion opening was opened for about 2 seconds and closed for about 4 seconds, and this cycle was repeated. Only while the subsidiary extrusion opening of the subsidiary extrusion flow passage was opened, "Eval EP-G" sold by Kuraray Inc. was fed into the subsidiary extrusion flow passage at an extrusion temperature of 200° to 220° C. under a feed pressure of 120 to 250 kg/cm$^2$. The resin composite extruded from the main extrusion opening was cooled, cut and examined. It had the vertical sectional shape shown in FIGS. 4 and 5, but roping of the subsidiary resin remained.

COMPARATIVE EXAMPLE 2

Comparative Example 1 was repeated except that the time of closing the subsidiary extrusion opening was prolonged to about 30 seconds. The extruded resin composite was cooled, cut and examined. Roping of the subsidiary resin remained.

We claim:

1. Apparatus for extruding multiple synthetic resins, comprising;
    a main extrusion flow passage having a main extrusion opening,
    means for providing a continuous flow of a main resin to said main extrusion flow passage;
    a subsidiary extrusion flow passage having a subsidiary extrusion opening, at least a downstream portion of the subsidiary extrusion flow passage being disposed in the main extrusion flow passage;
    means for providing an intermittent flow of subsidiary resin from said subsidiary extrusion flow passage;
    an auxiliary extrusion flow passage having an auxiliary extrusion opening, said auxiliary extrusion flow passage having a downstream portion which extends through the main extrusion flow passage where the main extrusion flow passage surrounds the downstream portion of the subsidiary extrusion flow passage, said auxiliary extrusion opening being positioned downstream of the subsidiary extrusion opening;
    means for providing a continuous flow of auxiliary resin to said auxiliary extrusion flow passage;
    said means for providing an intermittent flow of subsidiary resin including an opening-closing member for opening and closing the subsidiary extrusion opening during said continuous flow of main resin and auxiliary resin to provide said intermittent flow of subsidiary resin from said subsidiary extrusion flow passage, said opening-closing member having a forward end portion; and,
    means for moving said opening-closing member to a stationary position where it closes the subsidiary extrusion opening and the forward end portion thereof lies in the path of the auxiliary resin so that the auxiliary resin collides with said forward end portion to prevent the formation of a thread-like portion of the subsidiary resin in the main resin when the subsidiary extrusion opening is closed.

2. Apparats according to claim 1 wherein the forward end portion of the opening-closing member is of tapered shape, said opening-closing member being movable to a position where its forward end portion projects downstream of the subsidiary extrusion opening.

3. Apparatus according to claim 1 wherein the cross-sectional area of the auxiliary extrusion opening is substantially equal to that of the subsidiary extrusion opening.

4. Apparatus according to claim 3 wherein the forward end portion of the opening closing member is of tapered shape, said opening-closing member being movable to a position where its forward end portion projects downstream of the subsidiary extrusion opening.

* * * * *